(12) United States Patent
Guo et al.

(10) Patent No.: US 9,547,195 B2
(45) Date of Patent: Jan. 17, 2017

(54) LIQUID CRYSTAL DISPLAY AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN); Jian Guo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 264 days.

(21) Appl. No.: 14/360,523

(22) PCT Filed: Oct. 10, 2013

(86) PCT No.: PCT/CN2013/084978
§ 371 (c)(1),
(2) Date: May 23, 2014

(87) PCT Pub. No.: WO2015/010370
PCT Pub. Date: Jan. 29, 2015

(65) Prior Publication Data
US 2015/0109560 A1     Apr. 23, 2015

(30) Foreign Application Priority Data
Jul. 24, 2013   (CN) .......................... 2013 1 0313938

(51) Int. Cl.
*G02F 1/1335*     (2006.01)
*G02F 1/13363*    (2006.01)
(Continued)

(52) U.S. Cl.
CPC ....... *G02F 1/133617* (2013.01); *G02F 1/1362* (2013.01); *G02F 1/1368* (2013.01);
(Continued)

(58) Field of Classification Search
CPC ............ G02F 1/133617; G02F 1/13363; G02F 1/134336
(Continued)

(56) References Cited

U.S. PATENT DOCUMENTS

2004/0008302 A1   1/2004  Moon
2005/0122442 A1   6/2005  Park
(Continued)

FOREIGN PATENT DOCUMENTS

CN    101567406 A    10/2009
CN    102866535 A     1/2013
(Continued)

OTHER PUBLICATIONS

Korean Examination Opinion Appln. No. 10-2014-7020924; Dated Jul. 14, 2015.
(Continued)

*Primary Examiner* — Lucy Chien
(74) *Attorney, Agent, or Firm* — Ladas & Parry LLP

(57) ABSTRACT

A liquid crystal display (LCD) and a display device are disclosed. The LCD is provided with a plurality of pixel units; each pixel unit includes a plurality of sub-pixel units for displaying different colors; quantum dot (QD) layers capable of allowing backlight to run through are disposed at positions of an array substrate, corresponding to the sub-pixel units of at least one color of the pixel units; the QD layers are excited by ultraviolet light in sunlight and emit light which at least is of the color of the sub-pixel units; and color filters are disposed between the QD layers and the opposing substrate. The LCD has enhanced display bright-
(Continued)

ness and higher outdoor viewability in the case of outdoor display.

20 Claims, 10 Drawing Sheets

(51) Int. Cl.
    *G02F 1/1343*      (2006.01)
    *G02F 1/1368*      (2006.01)
    *G02F 1/1362*      (2006.01)

(52) U.S. Cl.
    CPC .... *G02F 1/13363* (2013.01); *G02F 1/133514* (2013.01); *G02F 1/134336* (2013.01); *G02F 2001/133614* (2013.01); *G02F 2001/133638* (2013.01)

(58) Field of Classification Search
    USPC .............................................. 349/68, 69, 71
    See application file for complete search history.

(56) References Cited

U.S. PATENT DOCUMENTS

| | | |
|---|---|---|
| 2005/0146258 A1 | 7/2005 | Weiss et al. |
| 2007/0007881 A1 | 1/2007 | Kim et al. |
| 2011/0261303 A1 | 10/2011 | Jang et al. |
| 2012/0156436 A1 | 6/2012 | Kim et al. |
| 2013/0010229 A1 | 1/2013 | Shin et al. |
| 2013/0146903 A1* | 6/2013 | Ichikawa ................ H01L 33/50 257/88 |

FOREIGN PATENT DOCUMENTS

| | | |
|---|---|---|
| KR | 20040006087 A | 1/2004 |
| KR | 20050053826 A | 6/2005 |
| KR | 20060113160 A | 11/2006 |
| KR | 20110118476 A | 10/2011 |
| WO | 2010/056240 A1 | 5/2010 |

OTHER PUBLICATIONS

International Search Report Appln. No. PCT/CN2013/084978; Dated Apr. 23, 2014.

First Chinese Office Action dated May 6, 2015; Appln. No. 201310313938.4.

International Preliminary Report on Patentability issued Jan. 26, 2016; PCT/CN2013084978.

\* cited by examiner

LIQUID CRYSTAL DISPLAY AND DISPLAY DEVICE

TECHNICAL FIELD

Embodiments of the present invention relate to a liquid crystal display (LCD) and a display device.

BACKGROUND

Quantum dots (QDs), also referred to as nanocrystals, are nanoparticles composed of group II-VI element or group III-V element. The particle size of the QDs is generally between 1 and 20 nm. As electrons and holes are subjected to quantum confinement, continuous energy band structures are converted into discrete energy level structures, and hence the QDs can emit fluorescent light after excitation.

The emission spectrum of QDs may be controlled by the variation of the size of QDs. The emission spectrum of QDs may cover the entire visible light spectrum by the variation of the size and the chemical composition of QDs. Taking CdTe QDs as an example, when the particle size of the QDs is increased from 2.5 nm to 4.0 nm, the emission wavelength of the QDs can be changed from 510 nm to 660 nm.

Currently, the QDs may be used as molecular probes and applied to fluorescent labels and also may be applied to display devices by means of the emission characteristic of the QDs. When monochromatic QDs are used for a light source of a backlight module of an LCD, the monochromatic QDs are excited by a blue-light light-emitting diode (LED) and emit white ambient light formed by the mixture of monochromatic light and blue light. The resultant light has a larger color gamut, so that the image quality can be improved.

A current LCD has relatively low display brightness in the situation of intense outdoor light when applied to outdoor display, and hence the viewing effect can be affected. In general, the transflective display mode can be adopted to brighten the LCD. However, the aperture ratio of pixel units in the LCD can be reduced when the transflective display mode is adopted.

SUMMARY

Embodiments of the present invention provide an LCD and a display device, which are configured to achieve high-brightness outdoor display.

One embodiment of the present invention provides an LCD, which comprises an opposing substrate, an array substrate and a liquid crystal layer disposed between the opposing substrate and the array substrate. The array substrate is provided thereon with a plurality of pixel units; each pixel unit comprises a plurality of sub-pixel units for displaying different colors; QD layers capable of allowing backlight to run through are disposed at positions of the array substrate, corresponding to the sub-pixel units of at least one color of the pixel units; the QD layers are excited by ultraviolet light in sunlight and emit light which at least is of the color of the corresponding sub-pixel units; the LCD is provided with color filters corresponding to the sub-pixel units; and the color filters are disposed between the QD layers and the opposing substrate.

In the LCD provided by the embodiment of the present invention, in the case of outdoor display, ultraviolet light in sunlight will irradiate the QD layers which will emit light after excited by the ultraviolet light. In this way, light running through the color filters is the sum of the backlight and the light emitted by the QD layers after excitation. Therefore, the display brightness of the LCD can be enhanced and the outdoor viewability of the LCD can be improved.

For instance, in the LCD provided by the embodiment of the present invention, the QD layers are excited by the ultraviolet light in sunlight and emit monochromatic light of the color of the corresponding sub-pixel units, so that the light emitted by the QD layers after the excitation of the ultraviolet light can be maximally utilized. For instance, the QD layers are excited by the ultraviolet light in sunlight and emit white light. Compared with the case that the QD layers are excited to emit monochromatic light, the complexity of the preparation process can be reduced.

For instance, in the LCD provided by the embodiment of the present invention, the QD layer comprises a high molecular polymer network and QDs uniformly distributed in the high molecular polymer network.

For instance, in the LCD provided by the embodiment of the present invention, the QD layers are disposed on one side of the array substrate facing towards the liquid crystal layer or disposed on one side of the array substrate away from the liquid crystal layer.

For instance, in the LCD provided by the embodiment of the present invention, an electrode structure comprising a common electrode and a pixel electrode which are mutually insulated is disposed on one side of the array substrate facing towards the liquid crystal layer; and the QD layer is disposed on one side of the electrode structure facing towards the liquid crystal layer.

For instance, in the LCD provided by the embodiment of the present invention, a first planarization layer is disposed between the electrode structures and the QD layers.

For instance, in the LCD provided by the embodiment of the present invention, a quarter-wave optical retardation layer is disposed between the QD layers and the liquid crystal layer. The quarter-wave optical retardation layer may convert circularly polarized light emitted by the QD layers after excitation into linearly polarized light, so that the light emitted by the QD layers after excitation can be better utilized.

For instance, in the LCD provided by the embodiment of the present invention, a second planarization layer is disposed on one side of the QD layer facing towards the liquid crystal layer; and the quarter-wave optical retardation layer is disposed on one side of the second planarization layer facing towards the liquid crystal layer.

For instance, in the LCD provided by the embodiment of the present invention, the color filters are disposed on one side of the array substrate facing towards the liquid crystal layer or disposed on one side of the opposing substrate facing towards the liquid crystal layer.

Another embodiment of the present invention provides a display device, which comprises the LCD provided by an embodiment of the present invention.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

The shape and size of film layers in the accompanying drawings do not reflect the true scale of an array substrate or an opposing substrate. The film layers are only partial structures of the array substrate and only intended to illustrate the content of the present invention.

Figure 1A:
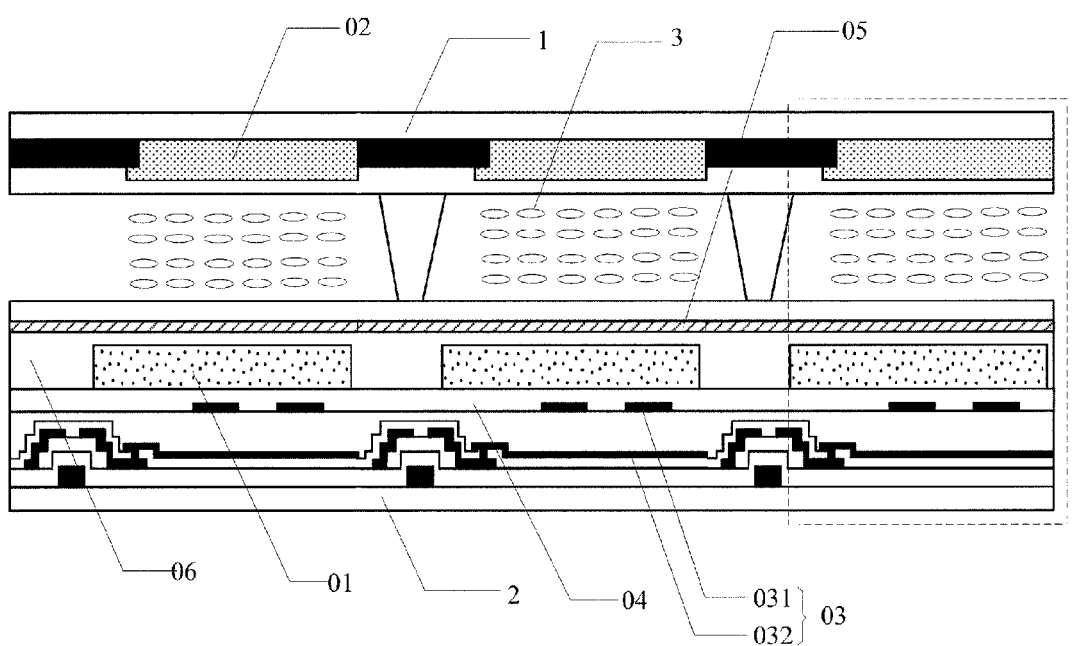
FIGS. 1a and 1b are respectively schematic structural views of an LCD provided by an embodiment of the present invention.
Figure 1B:
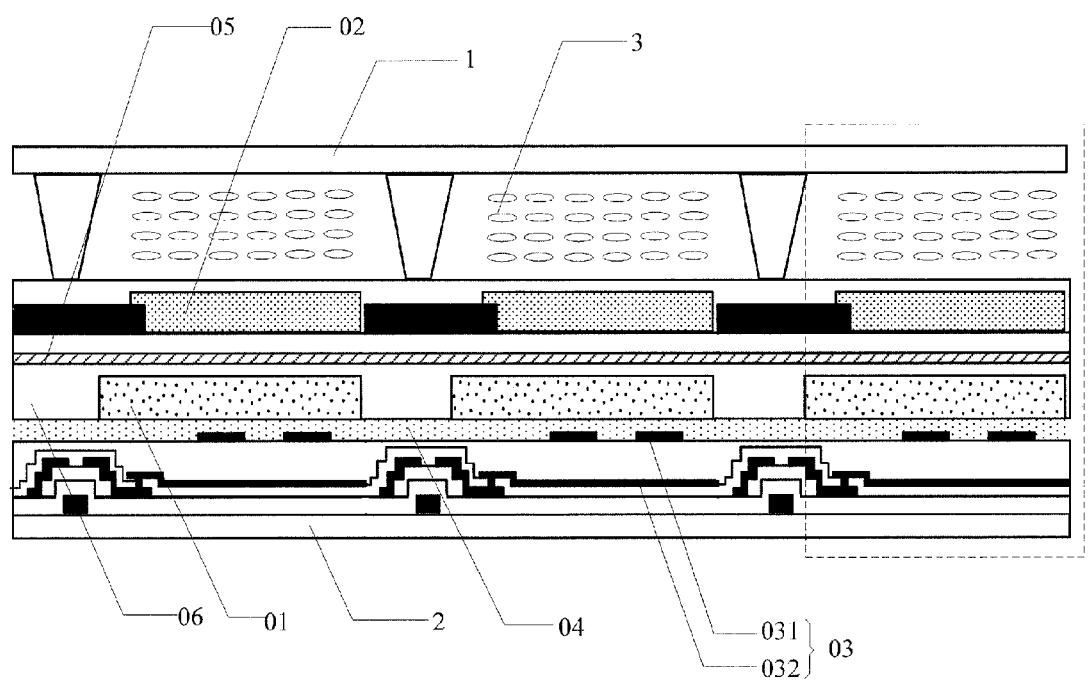

An embodiment of the present invention provides an LCD. As illustrated in FIGS. 1a and 1b, the LCD comprises an opposing substrate 1, an array substrate 2 and a liquid crystal layer 3 disposed between the opposing substrate 1 and the array substrate 2. The array substrate 2 is provided thereon with a plurality of pixel units that are arranged in an array, and each pixel unit comprises a plurality of sub-pixel units (as illustrated by a dotted line frame in the figure) for displaying different colors.

The array substrate may be provided with a plurality of gate lines and a plurality of data lines which are intercrossed to define the pixel units arranged in a matrix. Each pixel unit comprises a thin-film transistor (TFT) functioning as a switch element and a pixel electrode configured to control the arrangement of liquid crystals, and may further include a common electrode as desired. For instance, a gate electrode of the TFT of each pixel is electrically connected or integrally formed with a corresponding gate line; a source electrode is electrically connected or integrally formed with a corresponding data line; and a drain electrode is electrically connected or integrally formed with corresponding pixel electrode.

QD layers 01 capable of allowing backlight to pass through are disposed at positions of the array substrate 2 corresponding to the sub-pixel unit of at least one color in the pixel units. The QD layers 01 are excited by ultraviolet light in sunlight and emit light which at least is of the color of corresponding sub-pixel units.

The LCD is provided with color filters 02 corresponding to the sub-pixel units. The color filters 02 are disposed between the QD layers 01 and the opposing substrate 1, for instance, may be disposed on the opposing substrate 1 (as illustrated in FIG. 1a) or disposed on the array substrate 2 (as illustrated in FIG. 1b).

It should be noted that the QD layers may be only disposed in a display area of the LCD or a QD layer may be formed in the whole layer as long as the backlight from the backlight module can transmit through the QD layer(s) and be used for display under the modulation of the liquid crystal layer because the QD layers are light-transparent in the corresponding display area of the LCD.

Figure 2A:
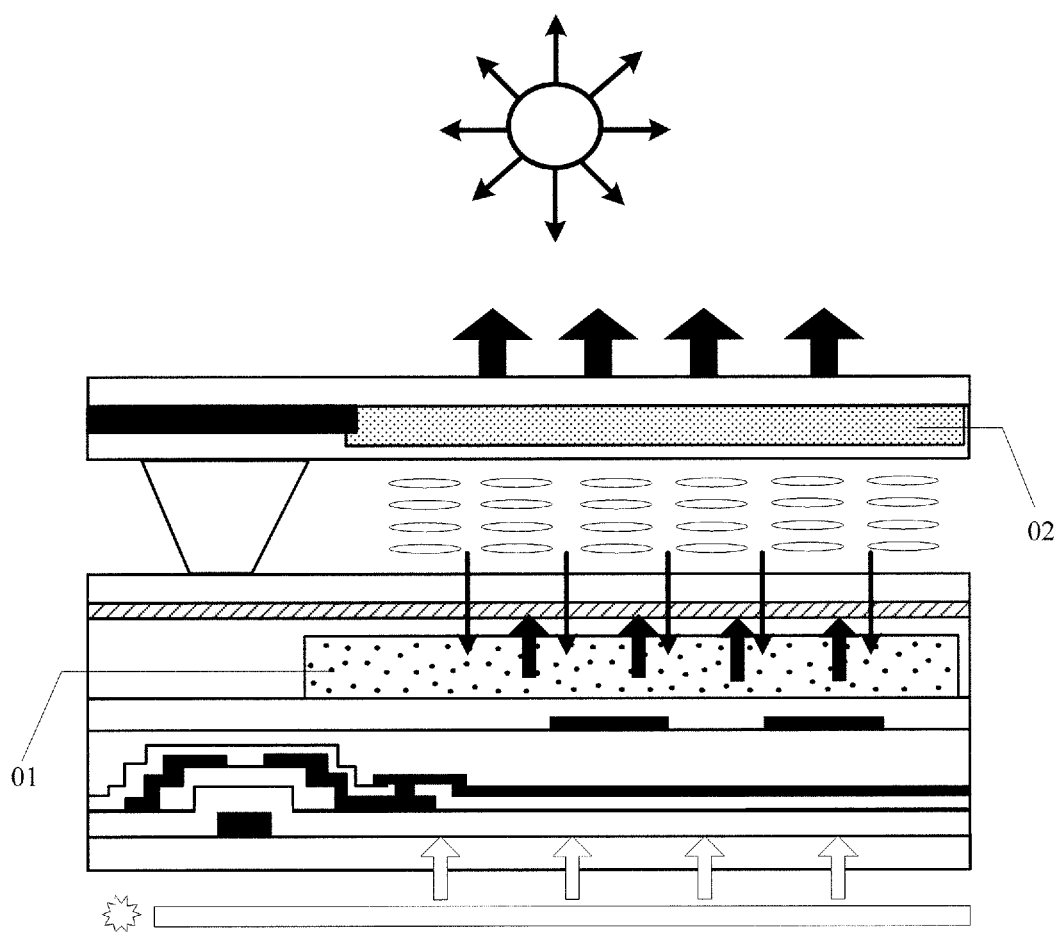
FIGS. 2a and 2b are respectively schematic diagrams of the LCD provided by an embodiment of the present invention in outdoor display and indoor display respectively.
Figure 2B:
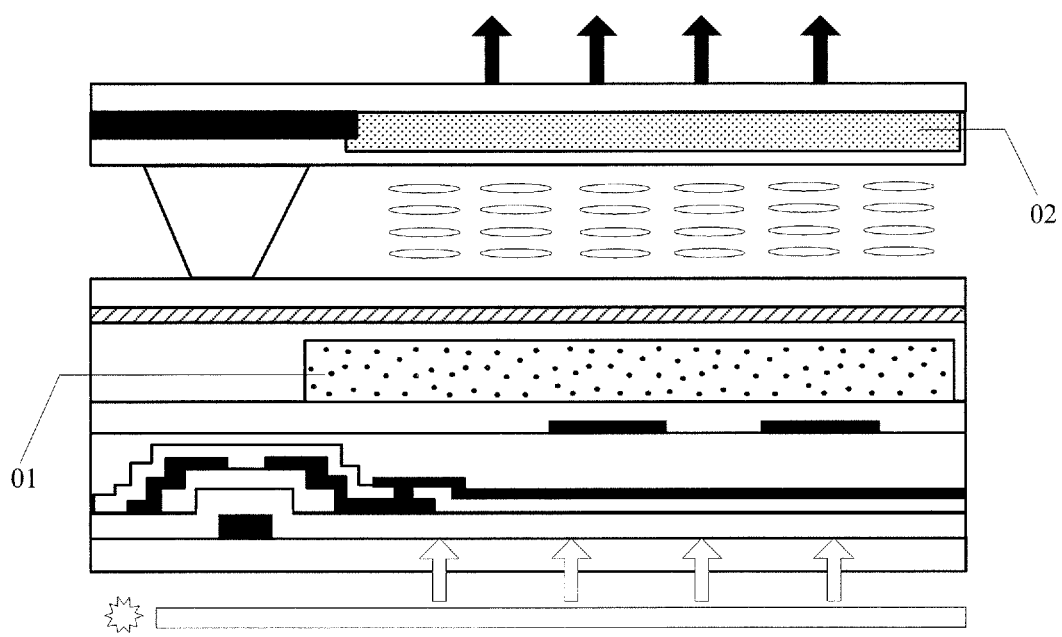

In the LCD provided by the embodiment of the present invention, as illustrated in FIG. 2a, in the case of outdoor display, the ultraviolet light in the sunlight will irradiate the QD layers 01 which will emit light after excited by the ultraviolet light, and the light can be emitted to the outside of the LCD again. In this way, the light running through the color filters 02 is the sum of the backlight from the backlight module 100 and the light emitted by the QD layers 01 after excitation, and hence the display brightness of the LCD can be enhanced and the outdoor viewability of the LCD can be improved. In the LCD provided by the embodiment of the present invention, as illustrated in FIG. 2b, in the case of indoor display, as the light intensity of indoor ultraviolet light is relatively weak, the QD layers 01 do not emit light. Therefore, the light running through the color filters 02 is only the backlight from the backlight module 100, and the LCD can still display normally.

Moreover, in a specific example, the QD layers 01 may be disposed at positions of the array substrate 2, corresponding to portion of the sub-pixel units, according to actual brightness requirements of different sub-pixel units. Of course, the QD layers 01 may also be disposed at positions of the array substrate 2, corresponding to all the sub-pixel units. No limitation will be given here.

In a specific example, the LCD provided by the embodiment of the present invention may have the following structure that: the color filters 02 are disposed on the opposing substrate 1, namely a color filter substrate. As illustrated in FIG. 1a, the color filters 02 are disposed on one side of the opposing substrate 1 facing towards the liquid crystal layer 3. In the LCD, the light emitted by the QD layers 01 after excitation and the backlight from the backlight module will be used for display through the light filtering of the color filters 02 after being modulated by the liquid crystal layer 3.

Of course, the LCD provided by the embodiment of the present invention may also have the following structure that: the color filters 02 are disposed on the array substrate 2, namely the structure of Color-Filter-on-Array (COA). As illustrated in FIG. 1b, the color filters 02 are disposed on one side of the array substrate 2 facing towards the liquid crystal layer 3. In the LCD, the light emitted by the QD layers after excitation and the backlight from the backlight module will be used for display by means of the modulation of the liquid crystal layer 3 after being subjected to the light filtering of the color filters 02.

For instance, in the LCD provided by the embodiment of the present invention, the QD layers can emit monochromatic light of the color of corresponding sub-pixel units after excited by the ultraviolet light in the sunlight, and hence the display brightness of the LCD under the sunlight environment can be maximally improved.

Or, for instance, in the LCD provided by the embodiment of the present invention, the QD layers may emit white light after excited by the ultraviolet light in the sunlight. Compared with the case that the QD layers emit monochromatic light after excitation, although one part of light will lose, the QD layers in the sub-pixel units may be prepared by a same material, and hence the complexity of the preparation process can be reduced. In the case that the QD layers emit the white light after excited by the ultraviolet light in the sunlight, QDs of various sizes may be mixed to form the QD layers. For instance, QDs for generating red, green, and blue (RGB) light after excitation correspondingly are mixed to form the QD layers. Light of various colors generated by the QD layers after the excitation of the ultraviolet light is mixed to produce white light.

For instance, for the convenience of implementation, in the LCD provided by the embodiment of the present invention, the QD layer may be formed of a high molecular polymer network and QDs uniformly distributed in the high molecular polymer network.

Moreover, for instance, the high molecular polymer network may be formed from the polymerization reaction of polymerizable monomers having double-bonds and organic modifiers, containing hydroxyl functional groups and sulfhydryl bonds, provided on surfaces of the QDs, and may also be formed from the polymerization of a mixture of phenolic resin derivatives and diazo naphthol derivatives after the irradiation of ultraviolet light under the action of a photoinitiator. Both the high molecular polymer networks produced by the two ways allow the QDs to be uniformly distributed in the high molecular polymer networks, so that the aggregation of the QDs can be prevented and the QD yield can be increased. Moreover, the high molecular polymer network cam isolate the QDs from the atmosphere and prevent the QDs from contacting oxygen, and hence the service life of the QDs can be prolonged. Of course, the high molecular polymer network may also be made of other materials. No limitation will be given here.

Moreover, as the emission wavelength of the QDs is relevant to the particle size of the QDs and the material(s) of the QDs. Taking zinc sulfide (ZnS) QDs as an example, QDs with the size of 9 to 10 nm mainly emit red light; QDs with the size of 8 nm emit yellow light; and QDs with the size of 7 nm emit green light. Therefore, the QDs distributed in the high molecular polymer network may comprise QDs of the same material and the same size or may comprise QDs made of different materials, as long as the size of the QDs among the QDs made of the materials can be controlled in such a way that the QDs can emit monochromatic light of the color of corresponding sub-pixel units after excited by the ultraviolet light. No limitation will be given here. Or, the QDs distributed in the high molecular polymer network may comprise QDs with different sizes and may also comprise QDs made of different materials, as long as the QDs can emit white light after excited by the ultraviolet light. No limitation will be given here.

Of course, the materials of the QDs include, but are not limited to, the above-mentioned substances. Other materials which are the same as or similar to the above substances in characteristics are also applicable. For instance, the QDs in the embodiment may be made of at least one material selected from the group consisting of ZnS, zinc oxide (ZnO), gallium nitride (GaN), zinc selenide (ZnSe), cadmium sulfide (CdS), gallium selenide (GaSe), cadmium selenide (CdSe), zinc telluride (ZnTe), cadmium telluride (CdTe), gallium arsenide (GaAs), indium phosphide (InP), and lead telluride (PbTe).

The LCD provided by the embodiments of the present invention may be applied in various modes, for instance, may be applied to advanced super dimension switch (ADSDS) mode LCD and may also be applied to the traditional twisted nematic (TN) mode or vertical alignment (VA) mode LCD. No limitation will be given here. For instance, as for the TN mode LCD, a common electrode may be formed on an opposing substrate as required and configured to cooperate with pixel electrodes on an array substrate to form electric fields for driving liquid crystal materials.

All the LCDs provided by the embodiments of the present invention are illustrated by taking the ADSDS mode LCD as an example.

For instance, in the LCD provided by an embodiment of the present invention, the QD layers 01 may be disposed on one side of the array substrate 2 facing towards the liquid crystal layer 3. Of course, the QD layers 01 may also be disposed on one side of the array substrate 2 away from the liquid crystal layer 3. No limitation will be given here.

Moreover, for instance, in the LCD provided by an embodiment of the present invention, as illustrated in FIGS. 1a and 1b, a electrode structure 03 formed by common electrodes 031 and pixel electrodes 032 which are mutually insulated are disposed on one side of the array substrate 2 facing towards the liquid crystal layer 3; and the QD layer 01 may be disposed on one side of the electrode structure 03 facing towards the liquid crystal layer 3. Of course, the QD layers 01 may also be disposed between other film layers in the array substrate 2 according to the requirement of the preparation process. No limitation will be given here. In addition, the common electrodes 031 and the pixel electrodes 032 of the electrode structure 03 may be as illustrated in FIGS. 1a and 1b: the common electrodes 031 are disposed above the pixel electrodes 032. The common electrodes 031 may also be disposed below the pixel electrodes 032. No limitation will be given here.

For instance, in the LCD provided by the embodiment of the present invention, for the convenience of arranging the QD layers 01, a first planarization layer 04 may further be disposed between the electrode structures 03 and the QD layers 01, as illustrated in FIGS. 1a and 1b.

In the LCD provided by an embodiment of the present invention, as the QD layers 01 may emit circularly polarized light in part after excited by the ultraviolet light, and the circularly polarized light cannot be modulated by liquid crystals. Therefore, in order to maximally utilize the light emitted by the QD layers after excitation, as illustrated in FIGS. 1a and 1b, in one example, a quarter-wave optical retardation layer 05 may further be disposed between the QD layers 01 and the liquid crystal layer 3 and can convert the circularly polarized light emitted by the QD layers 01 after excitation into linearly polarized light.

For instance, in the LCD provided by an embodiment of the present invention, for the convenience of arranging the quarter-wave optical retardation layer 05, a second planarization layer 06 may further be disposed on one side of the QD layer 01 facing towards the liquid crystal layer 3, and the quarter-wave optical retardation layer 05 is disposed on one side of the second planarization layer 06 facing towards the liquid crystal layer 3. For instance, the quarter-wave optical retardation layer 05 may be directly disposed on the second planarization layer 06, as illustrated in FIGS. 1a and 1b.

Detailed description will be given below to the manufacturing process of the array substrate 2, in which the QD layers 01 are disposed on one side of the array substrate 2 facing towards the liquid crystal layer 3.

EXAMPLE 1

Figure 3A:
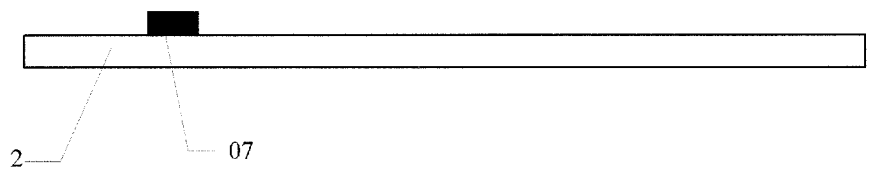
FIGS. 3a to 3m are respectively schematic structural views of the steps for manufacturing an array substrate in a first embodiment.
Figure 3B:
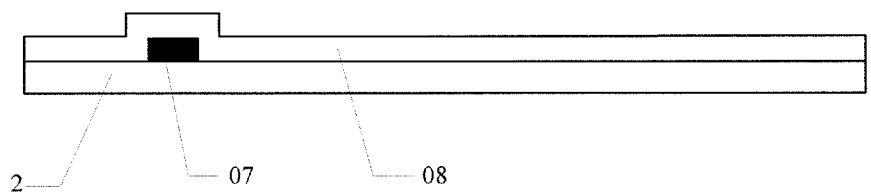
Figure 3C:
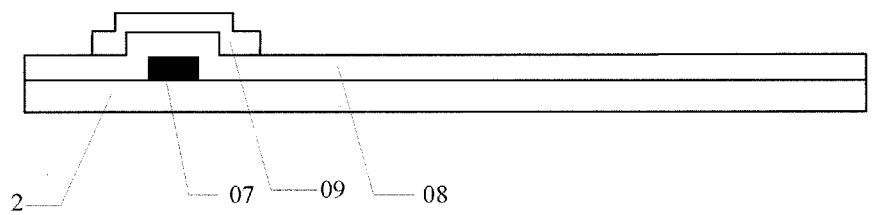
Figure 3D:
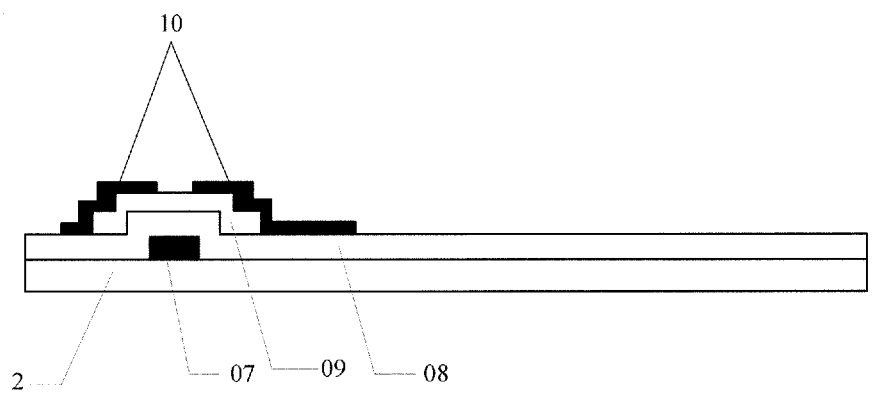
Figure 3E:
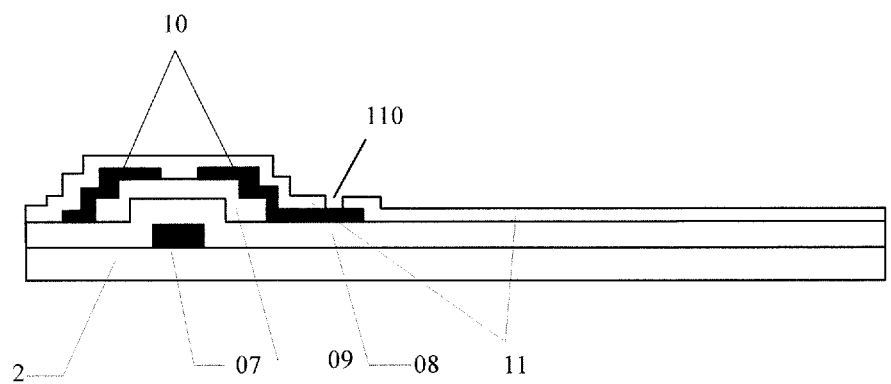
Figure 3F:
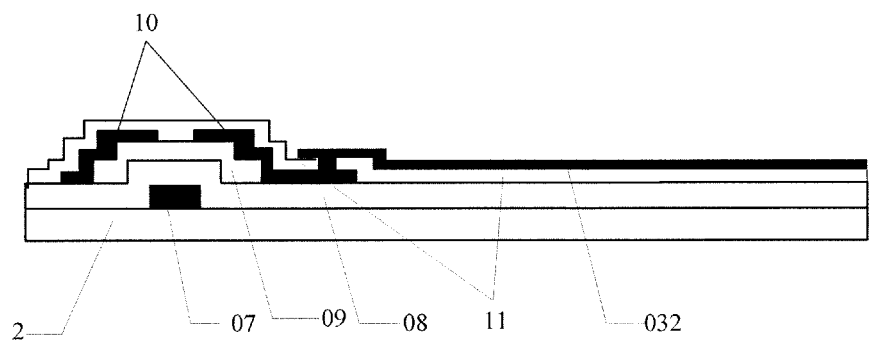
Figure 3G:
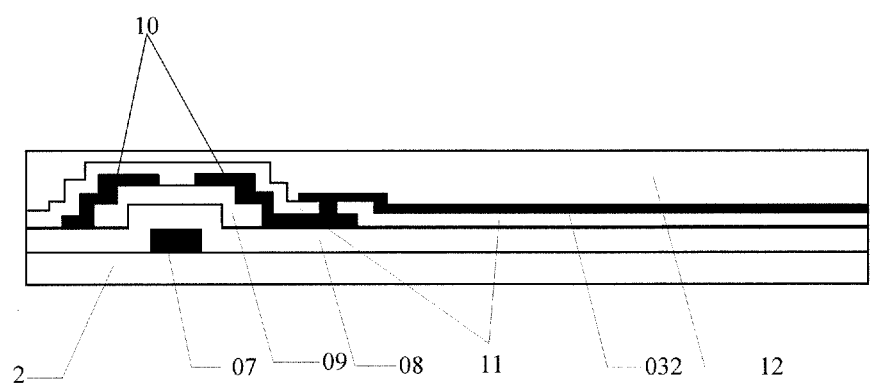
Figure 3H:
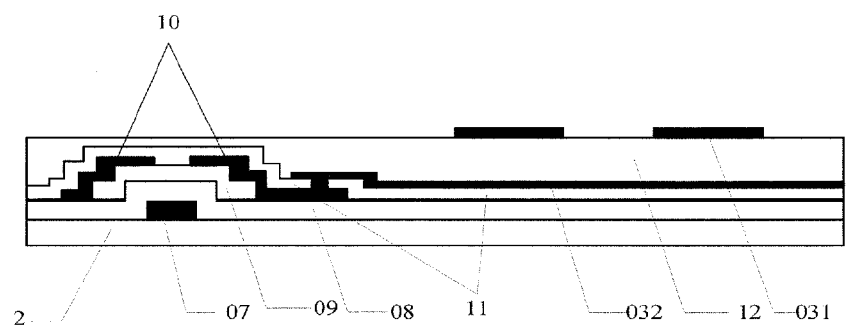
Figure 3I:
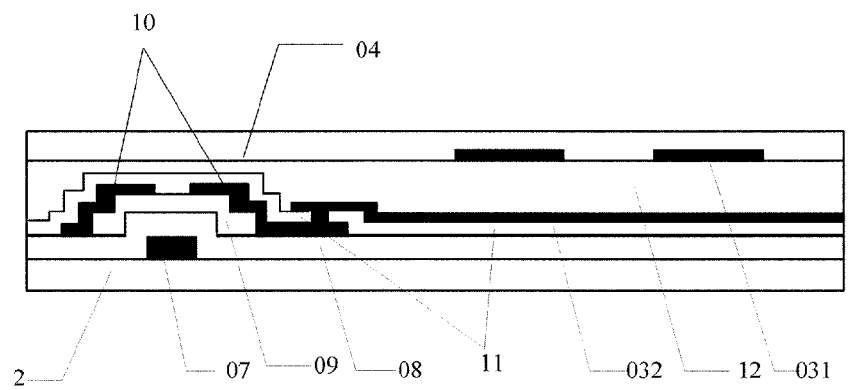
Figure 3J:
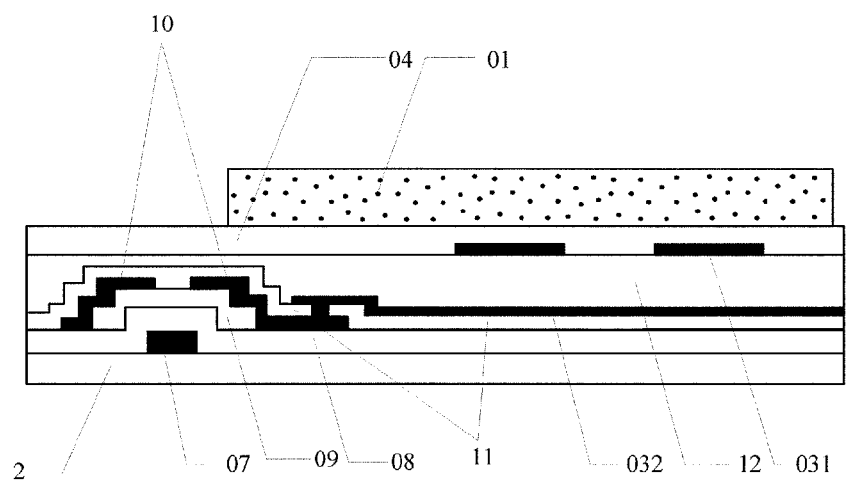
Figure 3K:
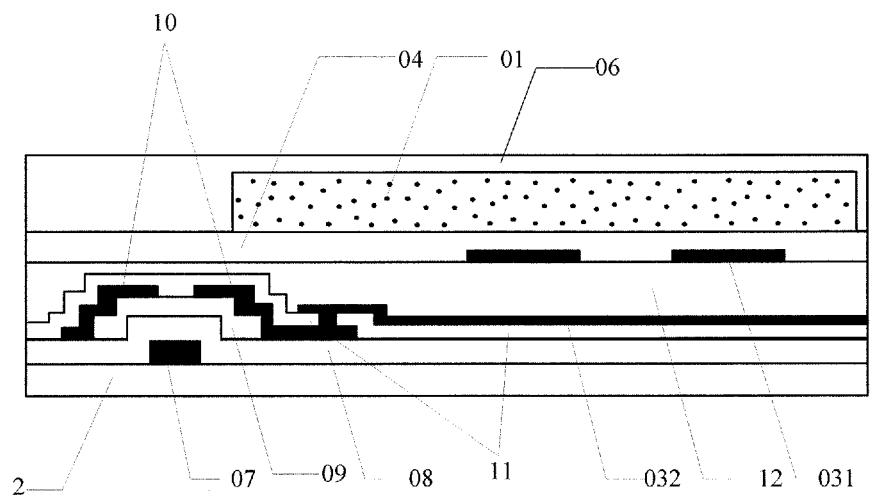
Figure 3L:
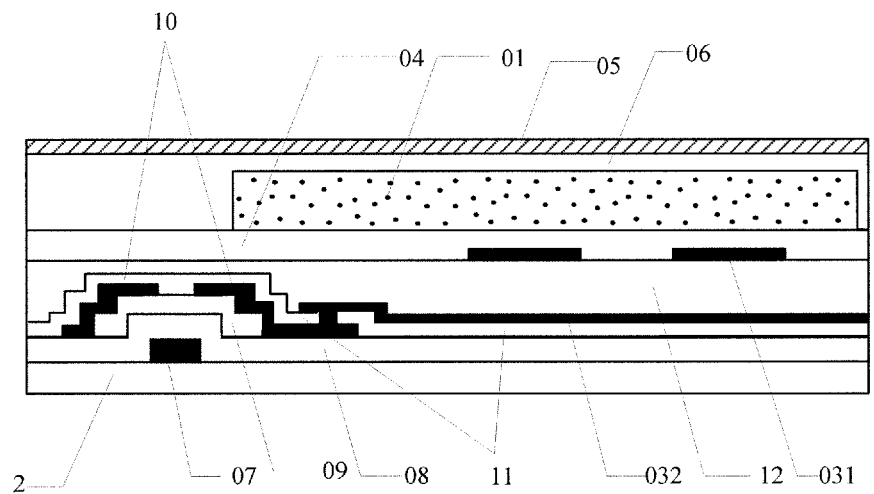

The color filters 02 in the LCD are disposed on the opposing substrate 1. The manufacturing process of the corresponding array substrate 2 comprises the following steps:

(1) forming patterns comprising gate lines (not shown) and gate electrodes 07 on the array substrate 2, as illustrated in FIG. 3a;

(2) forming a gate insulating layer 08 on the patterns of the gate electrodes 07, as illustrated in FIG. 3b, in which the gate insulating layer 08 covers the gate lines and the gate electrodes 07;

(3) forming a pattern comprising active layers 09 on the gate insulating layer 08 in which the active layers 09 are disposed over the gate electrodes 07 as illustrated in FIG. 3c;

(4) forming patterns comprising data lines (not shown) and source/drain electrodes 10 on the pattern of the active layers 09, as illustrated in FIG. 3d;

(5) forming a first insulating (PVX) layer 11 on the patterns of the source/drain electrodes 10 and the gate insulating layer 08, in which through holes 110 are formed in the first insulating layers 11, as illustrated in FIG. 3e;

(6) forming pixel electrodes 032 on the first insulating (PVX) layer 11, in which the pixel electrodes 032 are connected with drain electrodes of the source/drain electrodes 10 via the through holes 110 in the first insulating layer 11 as illustrated in FIG. 3f;

(7) forming a second insulating (PVX) layer 12 on the pixel electrode 032, as illustrated in FIG. 3g;

(8) forming common electrodes 031 on the second insulating (PVX) layer 12, as illustrated in FIG. 3h;

(9) forming a first planarization layer 04 on the common electrodes 031, as illustrated in FIG. 3i, for instance, the first planarization layer 04 may be made of a resin material;

(10) preparing QD layers 01 on the first planarization layer 04, as illustrated in FIG. 3j;

(11) forming a second planarization layer 06 on the QD layers 01, as illustrated in FIG. 3k, for instance, the second planarization layer 06 comprising a resin material;

(12) forming a quarter-wave optical retardation layer 05 on the second planarization layer 06, as illustrated in FIG. 3i; and

Figure 3M:
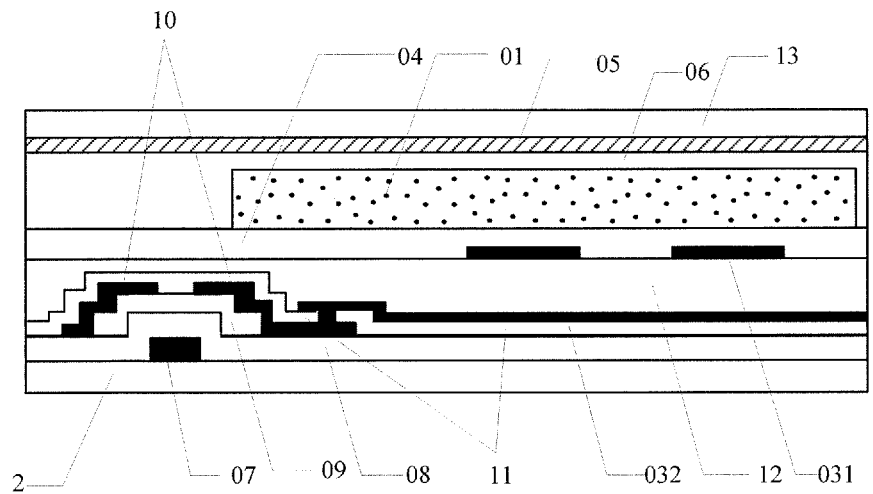

(13) forming a resin layer 13 on the quarter-wave optical retardation layer 05, as illustrated in FIG. 3m.

EXAMPLE 2

Figure 4A:
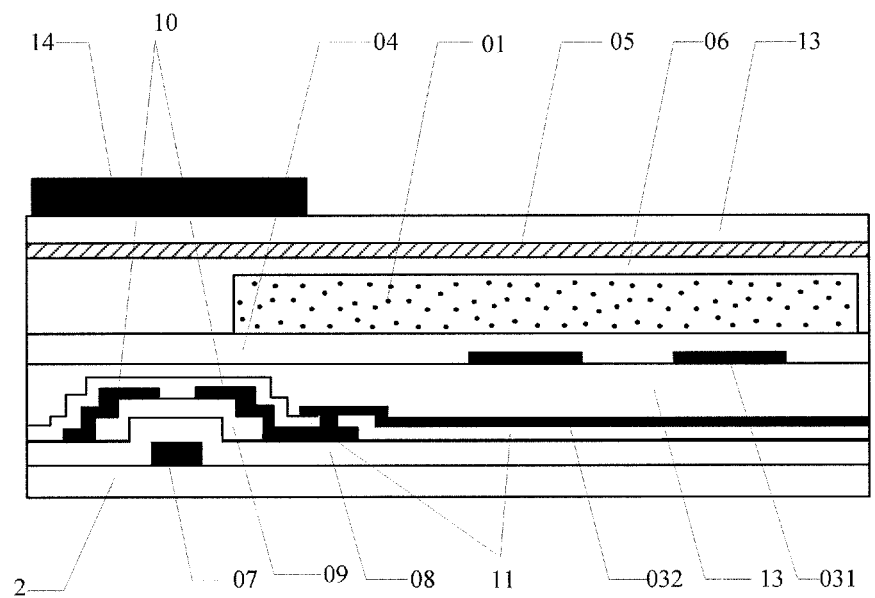
FIGS. 4a to 4c are respectively schematic structural views of the steps for manufacturing an array substrate in a second embodiment.
Figure 4B:
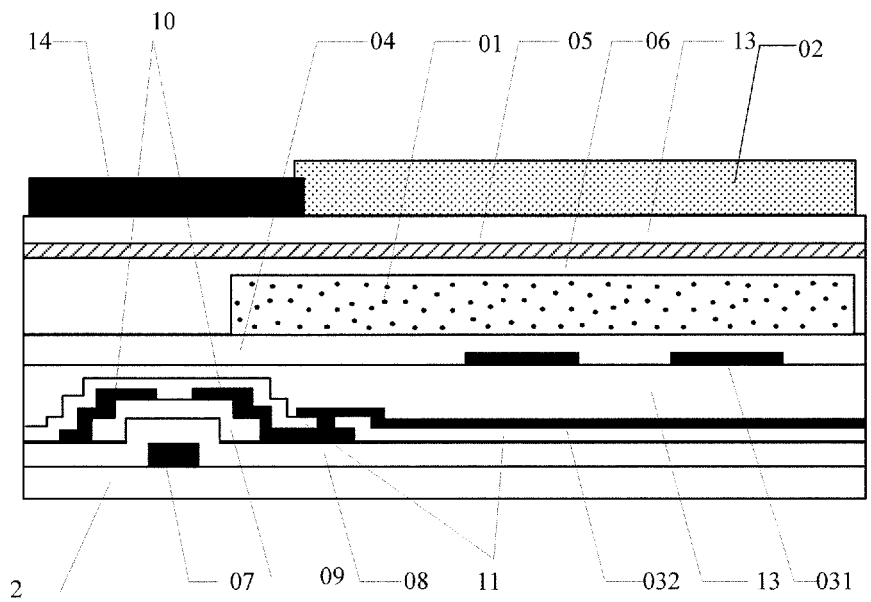

The color filters 02 in the LCD are disposed on the array substrate 2. The manufacturing process of the corresponding array substrate 2 further comprises the following steps apart from comprising the steps (1) to (13) in the example 1:

(14) forming a black matrix 14 on the resin layer 13, as illustrated in FIG. 4a;

(15) forming color filters 02 on the resin layer 13, as illustrated in FIG. 4b; and

Figure 4C:
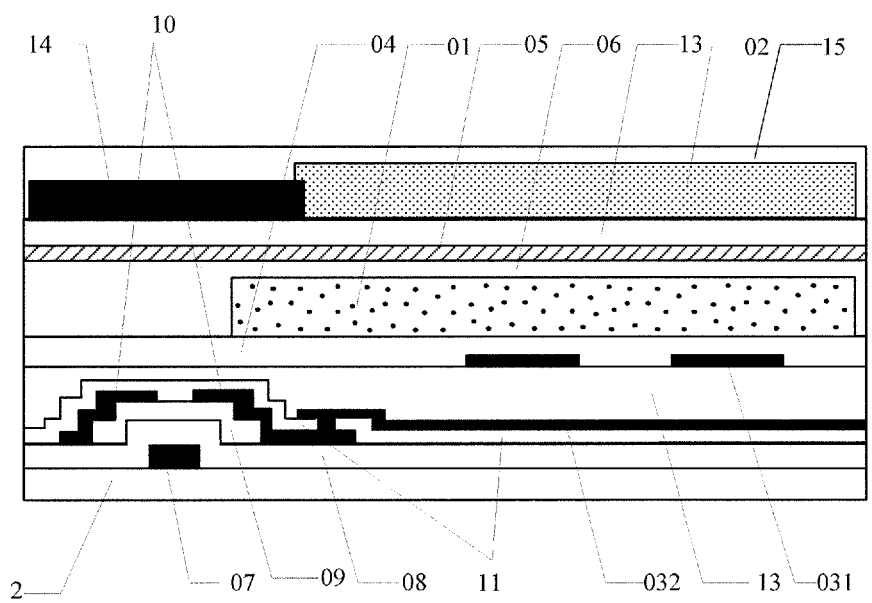

(16) forming a protective layer 15 on the black matrix 14 and the color filters 02, as illustrated in FIG. 4c.

Another embodiment of the present invention provides a display device, which comprises the LCD provided by an embodiment of the present invention and a backlight module. As the principle of the device in solving the problem is similar to that of the foregoing LCD, the implementation of the device may refer to the implementation of the LCD. No further description will be given here.

In the LCD and the display device provided by the embodiments of the present invention, the QD layers capable of allowing the backlight to run through are disposed at the positions of the array substrate, corresponding to the sub-pixel units of at least one color of the pixel units; the QD layers are excited by the ultraviolet light in the sunlight and emit the light which at least is of the color of the corresponding sub-pixel units; the LCD is provided with the color filters corresponding to the sub-pixel units; and the color filters are disposed between the QD layers and the opposing substrate. When the LCD is applied to outdoor display, the ultraviolet light in the sunlight will irradiate the QD layers which will emit light after excited by the ultraviolet light. Therefore, the light running through the color filters is the sum of the backlight and the light emitted by the QD layers after excitation, and hence the display brightness of the LCD can be enhanced and the outdoor viewability of the LCD can be improved.

The foregoing is only the preferred embodiments of the present invention and not intended to limit the scope of protection of the present invention. The scope of protection of the present invention should be defined by the appended claims.

The invention claimed is:

1. A liquid crystal display (LCD), comprising an opposing substrate, an array substrate and a liquid crystal layer disposed between the opposing substrate and the array substrate, wherein:
   the array substrate is provided thereon with a plurality of pixel units; each pixel unit comprises a plurality of sub-pixel units for displaying different colors;
   quantum dot (QD) layers capable of allowing backlight to run through are disposed at positions of the array substrate that correspond to the sub-pixel units of at least one color of the pixel units;
   the QD layers are excited by ultraviolet light in sunlight and emit light which at least is of the color of the corresponding sub-pixel units; and
   the LCD is provided with color filters corresponding to the sub-pixel units; and the color filters are disposed between the QD layers and the opposing substrate.

2. The LCD according to claim 1, wherein the QD layers are excited by the ultraviolet light in the sunlight and emit white light or monochromatic light of the color of the corresponding sub-pixel units.

3. The LCD according to claim 1, wherein the QD layers comprise a high molecular polymer network and QDs uniformly distributed in the high molecular polymer network.

4. The LCD according to claim 1, wherein the QD layers are disposed on one side of the array substrate facing towards the liquid crystal layer or disposed on one side of the array substrate away from the liquid crystal layer.

5. The LCD according to claim 1, wherein an electrode structure formed by a common electrode and a pixel electrode which are mutually insulated is disposed on one side of the array substrate facing towards the liquid crystal layer; and
   the QD layers are disposed on one side of the electrode structure facing towards the liquid crystal layer.

6. The LCD according to claim 5, wherein a first planarization layer is disposed between the electrode structures and the QD layers.

7. The LCD according to claim 1, wherein a quarter-wave optical retardation layer is disposed between the QD layers and the liquid crystal layer.

8. The LCD according to claim 7, wherein a second planarization layer is disposed on one side of the OD layer facing towards the liquid crystal layer; and the quarter-wave optical retardation layer is disposed on one side of the second planarization layer facing towards the liquid crystal layer.

9. The LCD according to claim 1, wherein the color filters are disposed on one side of the array substrate facing towards the liquid crystal layer or disposed on one side of the opposing substrate facing towards the liquid crystal layer.

10. A display device, comprising the LCD according to claim 1.

11. The LCD according to claim 2, wherein the QD layers comprise a high molecular polymer network and QDs uniformly distributed in the high molecular polymer network.

12. The LCD according to claim 2, wherein the QD layers are disposed on one side of the array substrate facing towards the liquid crystal layer or disposed on one side of the array substrate away from the liquid crystal layer.

13. The LCD according to claim 2, wherein an electrode structure formed by a common electrode and a pixel electrode which are mutually insulated is disposed on one side of the array substrate facing towards the liquid crystal layer; and the QD layers are disposed on one side of the electrode structure facing towards the liquid crystal layer.

14. The LCD according to claim 2, wherein a quarter-wave optical retardation layer is disposed between the QD layers and the liquid crystal layer.

15. The LCD according to claim 2, wherein the color filters are disposed on one side of the array substrate facing towards the liquid crystal layer or disposed on one side of the opposing substrate facing towards the liquid crystal layer.

16. The LCD according to claim 3, wherein the QD layers are disposed on one side of the array substrate facing towards the liquid crystal layer or disposed on one side of the array substrate away from the liquid crystal layer.

17. The LCD according to claim 3, wherein an electrode structure formed by a common electrode and a pixel electrode which are mutually insulated is disposed on one side of the array substrate facing towards the liquid crystal layer; and the QD layers are disposed on one side of the electrode structure facing towards the liquid crystal layer.

18. The LCD according to claim 3, wherein a quarter-wave optical retardation layer is disposed between the QD layers and the liquid crystal layer.

19. The LCD according to claim 18, wherein a second planarization layer is disposed on one side of the OD layer facing towards the liquid crystal layer; and the quarter-wave optical retardation layer is disposed on one side of the second planarization layer facing towards the liquid crystal layer.

20. The LCD according to claim 3, wherein the color filters are disposed on one side of the array substrate facing towards the liquid crystal layer or disposed on one side of the opposing substrate facing towards the liquid crystal layer.

* * * * *